(12) United States Patent
Andersson et al.

(10) Patent No.: US 11,492,946 B2
(45) Date of Patent: Nov. 8, 2022

(54) AFTERTREATMENT SYSTEM

(71) Applicant: VOLVO TRUCK CORPORATION, Gothenburg (SE)

(72) Inventors: Lennart Andersson, Varberg (SE); Soran Shwan, Mölndal (SE); Mathias Magnussson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/296,031

(22) PCT Filed: Nov. 26, 2018

(86) PCT No.: PCT/EP2018/082534
§ 371 (c)(1),
(2) Date: May 21, 2021

(87) PCT Pub. No.: WO2020/108725
PCT Pub. Date: Jun. 4, 2020

(65) Prior Publication Data
US 2022/0010710 A1 Jan. 13, 2022

(51) Int. Cl.
*F01N 3/20* (2006.01)
*F01N 13/00* (2010.01)
(Continued)

(52) U.S. Cl.
CPC ........... *F01N 3/208* (2013.01); *B01D 53/944* (2013.01); *B01D 53/9431* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 3,192,675 A1 | 2/2001 | Hirota et al. | |
| 2004/0037755 A1* | 2/2004 | Mital | F01N 13/009 422/177 |

(Continued)

FOREIGN PATENT DOCUMENTS

| | | |
|---|---|---|
| CN | 103348105 A | 10/2013 |
| CN | 105026716 A | 11/2015 |

(Continued)

OTHER PUBLICATIONS

International Search Report and Written Opinion dated Jul. 16, 2019 in corresponding International PCT Application No. PCT/EP2018/082534, 9 pages.

(Continued)

*Primary Examiner* — Binh Q Tran
(74) *Attorney, Agent, or Firm* — Venable LLP; Jeffri A. Kaminski (57) ABSTRACT

An aftertreatment system (100) connected downstream an internal combustion engine arrangement (102) for receiving combustion gas exhausted from the internal combustion engine arrangement (102) during operation thereof, the aftertreatment system (100) comprising a primary aftertreatment system (104) comprising a first catalytic reduction arrangement (106); a secondary reduction system (108) comprising a second catalytic reduction arrangement (110).

20 Claims, 5 Drawing Sheets

(51) Int. Cl.
*B01D 53/94* (2006.01)
*F01N 3/10* (2006.01)

(52) U.S. Cl.
CPC ..... *B01D 53/9468* (2013.01); *B01D 53/9477* (2013.01); *B01D 53/9495* (2013.01); *F01N 3/106* (2013.01); *F01N 3/2053* (2013.01); *F01N 13/0093* (2014.06); *B01D 2255/2092* (2013.01); *B01D 2255/20707* (2013.01); *B01D 2255/50* (2013.01); *F01N 2410/00* (2013.01); *F01N 2610/11* (2013.01); *F01N 2900/08* (2013.01); *F01N 2900/1602* (2013.01)

(56) References Cited

U.S. PATENT DOCUMENTS

| | | | |
|---|---|---|---|
| 2007/0199311 A1 | 8/2007 | Kalish | |
| 2007/0294999 A1* | 12/2007 | Yoshizaki | F01N 13/009 60/288 |
| 2008/0092530 A1* | 4/2008 | Toshioka | B01D 53/9431 60/301 |
| 2008/0295499 A1 | 12/2008 | Driscoll et al. | |
| 2009/0308060 A1* | 12/2009 | Suzuki | F01N 3/0233 60/311 |
| 2010/0043399 A1* | 2/2010 | Stroia | F01N 13/011 60/287 |
| 2011/0056190 A1* | 3/2011 | Nakata | F02D 41/025 60/297 |
| 2011/0058999 A1 | 3/2011 | Ettireddy et al. | |
| 2011/0146268 A1 | 6/2011 | Hepburn et al. | |
| 2012/0204542 A1* | 8/2012 | Norris | F01N 13/011 60/287 |
| 2015/0128576 A1 | 5/2015 | Osumi | |
| 2017/0044948 A1 | 2/2017 | Caine et al. | |
| 2018/0073444 A1* | 3/2018 | Zhang | F02D 41/0007 |

FOREIGN PATENT DOCUMENTS

| | | |
|---|---|---|
| CN | 106460611 A | 2/2017 |
| DE | 102010014468 A1 | 10/2011 |
| DE | 102012019947 A1 | 4/2014 |
| EP | 0916389 A1 | 5/1999 |
| EP | 2342433 B1 | 7/2013 |
| EP | 2860366 A1 | 4/2015 |
| JP | 2009047096 A | 3/2009 |
| WO | 2019022708 A1 | 1/2019 |
| WO | 2019129369 A1 | 7/2019 |

OTHER PUBLICATIONS

Chinese Office Action dated Jun. 2, 2022 in corresponding Chinese Patent Application No. 201880099723.8, 17 pages.

* cited by examiner

AFTERTREATMENT SYSTEM

CROSS-REFERENCE TO RELATED APPLICATIONS

This application is a U.S. National Stage application of PCT/EP2018/082534, filed Nov. 26, 2018, and published on Jun. 4, 2020, as WO 2020/108725 A1, all of which is hereby incorporated by reference in its entirety.

TECHNICAL FIELD

The present disclosure relates to an aftertreatment system. The disclosure also relates to a method for controlling a corresponding aftertreatment system. The aftertreatment system and method is applicable for vehicles, in particular low, medium and heavy duty vehicles commonly referred to as trucks. Although the disclosure will mainly be described in relation to a truck, it may also be applicable for other type of vehicles.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that becomes an important aspect when choosing vehicle engine. Furthermore, in the field of trucks, there are applicable law directives that have e.g. determined the maximum amount of exhaust gas pollution allowable.

In order to reduce harmful emissions, and in particular nitrogen oxide (NOx), the engine exhaust aftertreatment system (EATS) of the vehicles are continuously developed. The EATS often comprises a selective catalytic reduction (SCR) downstream the combustion cylinder, by which NOx can be converted into diatomic nitrogen (N2) and water (H2O). However, the exhaust temperature should preferably exceed a predetermined temperature threshold for proper functioning of the SCR.

There is thus a desire to improve the engine aftertreatment system, in particular to improve the system such as to reduce NOx gases both during low load operation where the temperature of the exhaust gas is relatively low, as well as during normal operation of the internal combustion engine when the temperature of the exhaust gas has reached a normal working temperature.

SUMMARY

The present disclosure describes an aftertreatment system which functions in a desirable manner during substantially the entire load spectrum of an internal combustion engine. This is at least partly achieved by an aftertreatment system according to claim 1.

According to a first aspect, there is provided an aftertreatment system connected downstream an internal combustion engine arrangement for receiving combustion gas exhausted from the internal combustion engine arrangement during operation thereof, the aftertreatment system comprising a primary aftertreatment system comprising a primary reduction system, the primary reduction system comprising a first catalytic reduction arrangement; a secondary reduction system comprising a second catalytic reduction arrangement, the secondary reduction system being positioned in a first conduit and arranged in fluid communication between the internal combustion engine arrangement and the primary aftertreatment system; a bypass conduit connected between the internal combustion engine arrangement and the primary aftertreatment system, wherein the bypass conduit and the first conduit are connected in parallel with each other; a first valve arrangement connected to the bypass conduit, the first valve arrangement being operable in a first state in which combustion gas exhausted from the internal combustion engine arrangement is directed through the first conduit to the primary aftertreatment system via the secondary reduction system, and second state in which combustion gas exhausted from the internal combustion engine arrangement is directed through the bypass conduit to the primary aftertreatment system bypassing the secondary reduction system; and a second valve arrangement arranged in the first conduit in fluid communication between the second catalytic reduction arrangement and the primary aftertreatment system.

The wording "primary aftertreatment system" and "secondary reduction system" should be interpreted as two separate systems of the aftertreatment system, whereby combustion gas from the internal combustion engine can be selectively directed to either directly to the primary aftertreatment system, or to the primary aftertreatment system via the secondary reduction system, depending on the current operating mode of the internal combustion engine arrangement.

A reduction system should be construed as a system which is arranged to convert environmentally harmful combustion gas to less harmful gas. An example, as will be described further below, is a selective catalytic reduction arrangement (SCR) which converts/reduces NOx gas to N2. Moreover, the first and second catalytic reduction arrangements are preferably operable in substantially similar temperature ranges, although the material configuration of the two catalytic reduction arrangements may differ to some extent. Preferably, the first and second catalytic reduction arrangements are operational in a temperature range between 200-500° C.

The present disclosure is based on the insight that by providing the aftertreatment system with a secondary reduction system, it is possible to selectively direct the combustion gas either directly to the primary aftertreatment system or to the primary aftertreatment system via the secondary reduction system based on the load situation of the internal combustion engine. Thus, the first valve arrangement is advantageously used for directing the combustion gas to the respective systems. Hereby, the combustion gas can be delivered to the aftertreatment system most capable of providing a proper reduction process.

Furthermore, the secondary reduction system can preferably be used as a close coupled reduction system, which is arranged closer to an outlet of the internal combustion arrangement in comparison to the primary aftertreatment system and which does not include other exhaust treatment devices, such as an oxidation catalyst or particulate filter, which would absorb heat. Hereby, the secondary reduction system can be heated relatively quickly such that reduction of combustion gas can be initiated thereto during e.g. cold start. Thereafter, when the primary aftertreatment system has reached a suitable operating temperature, the secondary reduction system can be bypassed. This will reduce the overall fuel consumption of the internal combustion engine. Also, the secondary reduction system can be designed to be highly chemically efficient in the available space close to the engine.

An advantage of using a second valve arrangement after the second catalytic reduction arrangement is that the gas pressure level over the second catalytic reduction arrangement increases. This will in turn increase the temperature level in the second catalytic reduction arrangement, thereby providing improved operation of the second catalytic reduction arrangement. Also, the use of a second valve arrangement will imply that the flow velocity in the second catalytic reduction arrangement is reduced. Hereby, the molecules in the combustion gas can be kept in the second catalytic reduction arrangement for a longer duration of time which will increase the chances of successful NOx reduction. Moreover, using a second valve arrangement can enable the use of a first valve arrangement which is relatively simple in design. Also, the second valve arrangement can prevent undesirable diffusion of exhaust gas into the primary aftertreatment system.

A further advantage is that the durability of the secondary reduction system will be improved as it will be less exposed to e.g. exhaust gas when only operated during e.g. cold start.

According to an example embodiment, the first valve arrangement may comprise a three-way valve for selectively directing combustion gas to the first conduit and the bypass conduit. Hereby, the three-way valve can be relatively easily controlled to direct combustion gas solely to the primary aftertreatment system, or to the secondary reduction system. Other type of valves are also conceivable, such as e.g. a butterfly valve in combination with the below described second valve arrangement.

According to an example embodiment, the second valve arrangement may be operable from a closed position to an open position when a gas pressure level in the first conduit exceeds a predetermined gas pressure threshold limit. Hereby, the secondary reduction system can be allowed to operate at relatively high pressures, which will result in higher reduction performance over the secondary reduction system and higher combustion gas temperature which will result in a faster heating of the aftertreatment system. Also, combustion gas in the first conduit is allowed to enter the primary aftertreatment system only when the gas pressure level exceeds the predetermined gas pressure threshold limit.

According to an example embodiment, the second valve arrangement may preferably be one of a pneumatically controlled check valve or an electronically controlled valve connected to a control unit for control of operation thereof. A pneumatically controlled check valve may preferably use a spring or the like which will position the check valve in the open position when the pressure level exceeds the predetermined limit. If using an electronically controlled valve, a pressure sensor or the like is preferably used for detecting a pressure level in the first conduit. The second valve arrangement is then opened in response to a signal from the pressure sensor being indicative of a pressure level above the predetermined limit. An electronically controlled valve may preferably be connected to the below described control unit for controlling operation thereof.

According to an example embodiment, the first and second catalytic reduction arrangements may be respective selective catalytic reduction devices arranged to convert nitrogen oxides (NOx) into diatomic nitrogen (N2).

According to an example embodiment, the secondary reduction system may comprise a reducing agent injector arranged in the first conduit upstream the second catalytic reduction arrangement for supplying reducing agent to the combustion gas before the combustion gas enters the second catalytic reduction arrangement.

According to an example embodiment, the secondary reduction system may comprise a reducing agent injector arranged in the exhaust conduit, preferably near the turbine. Thus the reductant can be well mixed with the turbulent flow created by the turbo and/or exhausts port, and thereby enabling a very short distance between the engine and the second catalytic device.

According to an example embodiment, the aftertreatment system may further comprise a control unit connected to the first valve arrangement for controlling operation thereof.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the control unit may be configured to receive a signal indicative of a temperature level of the first catalytic reduction arrangement; compare the temperature level with a predetermined temperature threshold limit; control the first valve arrangement to direct combustion gas from the internal combustion engine arrangement to the primary aftertreatment system via the first conduit if the temperature level of the first catalytic reduction arrangement is below to the predetermined temperature threshold limit; and control the first valve arrangement to direct combustion gas from the internal combustion engine arrangement to the primary aftertreatment system via the bypass conduit if the temperature level of the first catalytic reduction arrangement is above or equal to the predetermined temperature threshold limit.

According to an example embodiment, the control unit may be configured to receive a signal indicative of a temperature level of the internal combustion engine arrangement; compare the temperature level of the internal combustion engine arrangement with a predetermined engine temperature threshold limit; control the first valve arrangement to direct combustion gas from the internal combustion engine arrangement to the primary aftertreatment system via the first conduit if the temperature level of the internal combustion engine arrangement is below the predetermined engine temperature threshold limit; and control the first valve arrangement to direct combustion gas from the internal combustion engine arrangement to the primary aftertreatment system via the bypass conduit if the temperature level of the internal combustion engine arrangement is above or equal to the predetermined engine temperature threshold limit.

The predetermined temperature threshold limit may preferably be a temperature limit when the primary aftertreatment system operates as desired, i.e. a temperature limit where the primary aftertreatment system is able to provide a desirable reduction process.

Hereby, during e.g. cold start and operation when the internal combustion engine arrangement is relatively cold, combustion gas is guided to the secondary reduction system before the combustion gas is provided to the primary aftertreatment system. The combustion gas will thus have an increased temperature level when reaching the primary aftertreatment system in comparison to a situation when the secondary reduction system is bypassed.

The temperature level may additionally, or in combination, be determined by measuring the temperature level of the engine coolant. Also, the control unit may be arranged to receive a signal indicative of an amount of ammonia present in the primary aftertreatment system, and control the first valve arrangement to direct combustion gas to the secondary reduction system or to bypass the secondary reduction system.

According to an example embodiment, the aftertreatment system may further comprise a burner arrangement positioned in fluid communication between the internal combustion engine arrangement and the first valve arrangement. Hereby, the combustion gas can be heated which is beneficial for operation of the reduction systems.

According to an example embodiment, the primary aftertreatment system may further comprise a primary reducing agent injector arranged upstream the first catalytic reduction arrangement for supplying reducing agent to the combustion gas before the combustion gas enters to the first catalytic reduction arrangement. Hereby, it can be assured that reductant is available for the reduction process.

According to an example embodiment, the primary aftertreatment system may further comprise an oxidation catalyst and a particulate filter upstream the first catalytic reduction arrangement.

The oxidation catalyst may be a diesel oxidation catalyst and the particulate filter may be a diesel particulate filter in case the internal combustion engine arrangement is a diesel engine. By providing an oxidation catalyst and particulate filter, a further reduction of environmentally harmful combustion gases is achieved. The oxidation catalyst has the primary function to oxidize hydrocarbons and carbon monoxide with oxygen to carbon dioxide. The oxidation catalyst may also oxidize nitrogen monoxide (NO) to nitrogen dioxide (NO2). The functioning of the particulate filter is to catch soot and oxidize the soot with NO2 and O2 to carbon dioxide. To enable the soot oxidation by NO2, the particulate filter preferably comprises an oxidation catalytic layer which oxidizes NO to NO2.

According to an alternative, the primary aftertreatment system may comprise a particulate filter with SCR coating, a so-called SCR on DPF, also trademarked as SCRF and SDPF.

According to an example embodiment, the oxidation catalyst may comprise a plurality of catalyst layers for oxidizing components in the combustion gas. The layers may advantageously be arranged for oxidizing components like hydrocarbons, nitrogen monoxide, carbon monoxide, soot, UREA and ammonia.

According to an example embodiment, the plurality of catalyst layers may comprise a material composition of metal oxides and/or zeolites. The plurality of catalyst layers may be arranged at the inlet of the oxidation catalyst. The metal oxides and/or zeolites may be arranged form a selective ammonia oxidation catalyst. The metal oxides may e.g. be $Al_2O_3$, $TiO_3$. The zeolites may e.g. be CHA, BEA, and/or LTA. The metal oxides may include the noble metals Palladium and Platinum and the zeolite can be ion exchanged with either copper or iron. This type of selective ammonia oxidation catalyst placed in the primary aftertreatment system is especially beneficial when the reductant injector is placed in the exhaust conduit. After the cold start, urea deposit and liquid film may be left on the exhaust pipe wall and slowly evaporate. When the secondary reduction system is bypassed, the vapors from the deposit and liquid films are selectively oxidized to N2 and H2O. It also enables purging of the injector without engaging the secondary reduction system.

According to an example embodiment, the oxidation catalyst may further comprise a substrate layer comprising cordierite. The substrate layer may alternatively comprise metal sheets.

According to a second aspect, there is provided a method for controlling an aftertreatment system connected downstream an internal combustion engine arrangement, the aftertreatment system comprises a primary aftertreatment system comprising a primary reduction system, the primary reduction system comprising a first catalytic reduction arrangement; a secondary reduction system comprising a second catalytic reduction arrangement, the secondary reduction system being arranged in fluid communication between the internal combustion engine arrangement and the primary aftertreatment system via a first conduit; and a bypass conduit connected between the internal combustion engine arrangement and the primary aftertreatment system, wherein the bypass conduit and the first conduit are connected in parallel with each other, the method comprising the steps of determining if the internal combustion engine arrangement is operating in a first operating mode or in a second operating mode; directing combustion gas from the internal combustion engine arrangement to the primary aftertreatment system via the secondary reduction system if the internal combustion engine arrangement is operating in the first operating mode; directing combustion gas from the internal combustion engine arrangement to the primary aftertreatment system via the bypass conduit for bypassing the secondary reduction system if the internal combustion engine arrangement is operating in the second operating mode.

According to an example embodiment, the internal combustion engine arrangement may be operating in the first operating mode if the temperature level of the first catalytic reduction arrangement is below a predetermined temperature threshold limit.

The gas pressure level in the secondary catalytic reduction arrangement, when the internal combustion engine arrangement is operated in the first operating mode, is preferably controlled by a second valve arrangement in the first conduit.

According to an example embodiment, the method may further comprise the steps of determining an amount of ammonia absorbed in the first catalytic reduction arrangement; and determining that the internal combustion engine arrangement is operating in the first operating mode if the amount of absorbed ammonia is below a predetermined threshold limit.

According to an example embodiment, the internal combustion engine arrangement may be operating in the first operating mode if the temperature level of the internal combustion engine arrangement is below a predetermined engine temperature threshold limit.

Further effects and features of the second aspect are largely analogous to those described above in relation to the first aspect.

According to a third aspect, there is provided a vehicle comprising an internal combustion engine arrangement and an aftertreatment system according to any one of the embodiments described above in relation to the first aspect.

According to a fourth aspect, there is provided a computer program comprising program code means for performing the steps of any one of the embodiments described above in relation to the second aspect when the program is run on a computer.

According to a fifth aspect, there is provided a computer readable medium carrying a computer program comprising program means for performing the steps of any one of the embodiments described above in relation to the second aspect when the program means is run on a computer.

Effects and features of the third, fourth and fifth aspects are largely analogous to those described above in relation to the first and second aspects.

Further features of, and advantages with, the present disclosure will become apparent when studying the appended claims and the following description. The skilled person will realize that different features of the present disclosure may be combined to create embodiments other than those described in the following, without departing from the scope of the present disclosure.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

DETAILED DESCRIPTION

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference character refer to like elements throughout the description.

Figure 1:
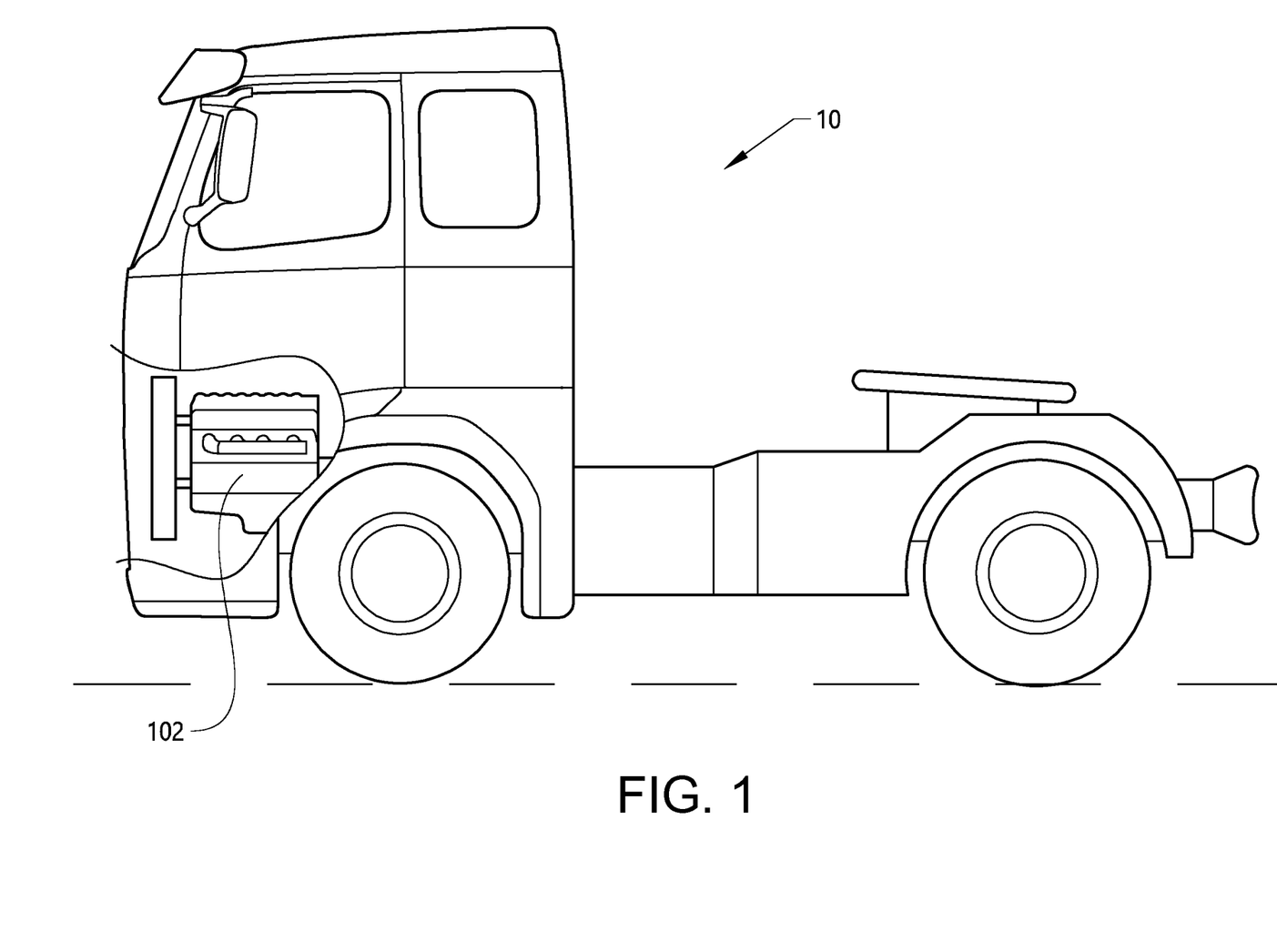
FIG. 1 is a lateral side view illustrating an example embodiment of a vehicle in the form of a truck.

With particular reference to FIG. 1, there is provided a vehicle 10 in the form of a truck. The vehicle 10 comprises a prime mover 102 in the form of an internal combustion engine arrangement 102. The internal combustion engine arrangement 102 may preferably use a conventional fuel such as diesel, although other alternatives are conceivable. The internal combustion engine 102 is preferably operated in a four stroke fashion, i.e. operated by an intake stroke, a compression stroke, a combustion stroke, and an exhaust stroke.

Figure 2:
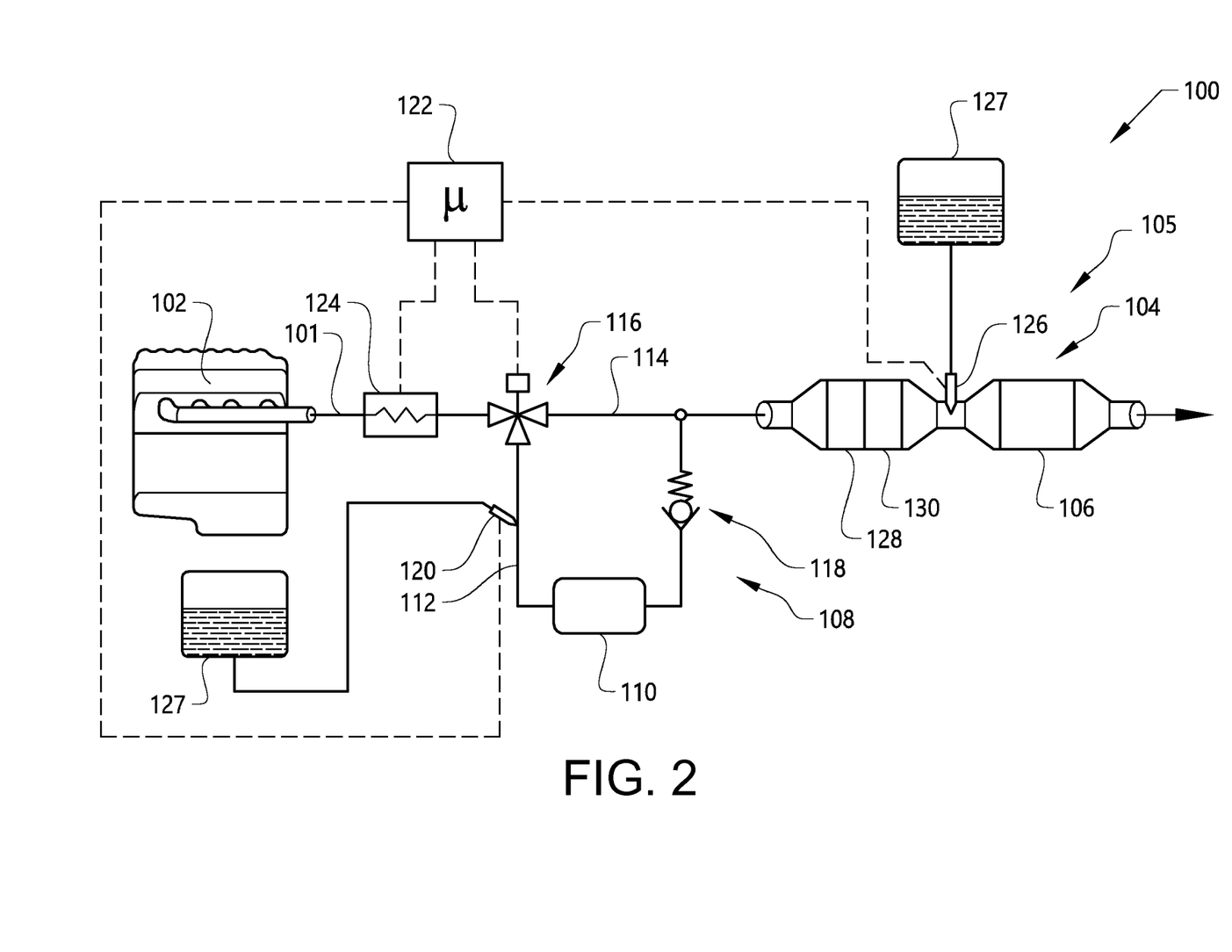
FIG. 2 is a schematic illustration of the aftertreatment system according to an example embodiment.

Reference is made to FIG. 2, which schematically illustrates an aftertreatment system 100 according to an example embodiment. As can be seen, the aftertreatment system 100 is connected to, and arranged downstream the internal combustion engine 102 of the vehicle 10. In particular, the aftertreatment system 100 is connected to the internal combustion engine 102 by means of an exhaust conduit 101.

The aftertreatment system 100 comprises a primary aftertreatment system 104 and a secondary reduction system 108.

The primary aftertreatment system 104 further comprises a primary reduction system 105 which comprises a first catalytic arrangement 106. The first catalytic arrangement 106 is preferably a selective catalytic reduction device, which is a device arranged to, during operation, convert nitrogen oxides $NO_x$ into diatomic nitrogen $N_2$ (and water). The primary aftertreatment system 104 depicted in FIG. 2 also comprises an oxidation system comprising an oxidation catalyst 128 and particulate filter 130, which are positioned upstream the first catalytic arrangement 106. Hence, combustion gas from the internal combustion engine is provided to the oxidation catalyst 128 and particulate filter 130 before the combustion gas subsequently is directed to the primary reduction system 105.

The secondary reduction system 108 comprises a second catalytic reduction arrangement 110. The second catalytic reduction arrangement 110 is also preferably a selective catalytic reduction device arranged to, during operation, convert nitrogen oxides $NO_x$ into diatomic nitrogen $N_2$ (and water). As depicted, the secondary reduction system 108 is positioned in a first conduit 112 of the aftertreatment system 100. The second catalytic reduction arrangement 110 is arranged upstream the primary aftertreatment system 104 such that combustion gas from the internal combustion engine 102 enters the primary aftertreatment system 104 after having been directed through the second catalytic reduction arrangement 110.

The aftertreatment system 100 further comprises a first valve arrangement 116 and a bypass conduit 114. The bypass conduit 114 is arranged in parallel with the first conduit 112. The first valve arrangement 116, which preferably comprises a three-way valve, is connected between the exhaust conduit 101, the first conduit 112 and the bypass conduit 114. Hence, the first valve arrangement 116 is arranged in fluid communication with each of the exhaust conduit 101, the first conduit 112 and the bypass conduit 114. Hereby, the first valve arrangement 116 is arranged to controllably direct combustion gas exhausted from the internal combustion engine 102 to either the second catalytic reduction arrangement 110 via the first conduit 112, or directly to the first catalytic reduction arrangement 106 via the bypass conduit 114. In the latter case, the secondary reduction system 108, and in particular the second catalytic reduction arrangement 110 is bypassed. Further details relating to the operation of the first valve arrangement 116 is given below.

Moreover, the primary aftertreatment system 104 may, as indicated in FIG. 2 comprise, a primary reducing agent injector 126 which is arranged in fluid communication with a reducing agent tank 127, or equivalent. Hereby, reductant, such as e.g. urea, can be supplied to the combustion gas before the combustion gas is directed into the first catalytic reduction arrangement. Similarly, the secondary reduction system 108 may also comprise a reducing agent injector 120 which is arranged in fluid communication with the reducing agent tank 127, or equivalent. The reducing agent injector 120 is connected to the secondary reduction system in the first conduit 112 at a position upstream the second catalytic reduction arrangement 110. Thus, reductant, such as e.g. urea, can be supplied to the combustion gas before the combustion gas is directed into the second catalytic reduction arrangement.

Still further, the aftertreatment system 100 also comprises a second valve arrangement 118. As indicated in FIG. 2, the second valve arrangement 118, illustrated and in the following exemplified as a check valve, is arranged in the secondary reduction system 108 in the first conduit 112 at a position downstream the second catalytic reduction arrangement 110.

The check valve 118 is arranged to be arranged in an open position when the gas pressure level in the first conduit exceeds a predetermined gas pressure threshold limit. Hereby, NOx conversion to N2 in the second catalytic reduction arrangement 110 will be made at higher pressure level which will increase the temperature level of the gas in the second catalytic reduction arrangement 110, resulting in a beneficially increased NOx reduction performance.

Furthermore, the aftertreatment system 100 may comprise a burner arrangement 124. As depicted, the burner arrangement 124 is preferably arranged in the exhaust conduit 101, and thus arranged in fluid communication between the internal combustion engine 102 and the first valve arrangement 116. During e.g. cold start, the combustion gas can be pre-heated by the burner arrangement 124 before the combustion gas is directed further downstream the aftertreatment system 100.

Moreover, the aftertreatment system 100 preferably comprises a control unit 122 connected to various parts of the aftertreatment system 100 for controlling operation thereof. In particular, the control unit 122 is connected to the first valve arrangement 116, the burner arrangement 124, the reducing agent injector 120 of the secondary reduction system 108, and the primary reducing agent injector 126 of the primary aftertreatment system 104. Moreover, in case the check valve 118 is an electronically controlled check valve, the control unit 122 is also connected to the check valve.

Figure 3:
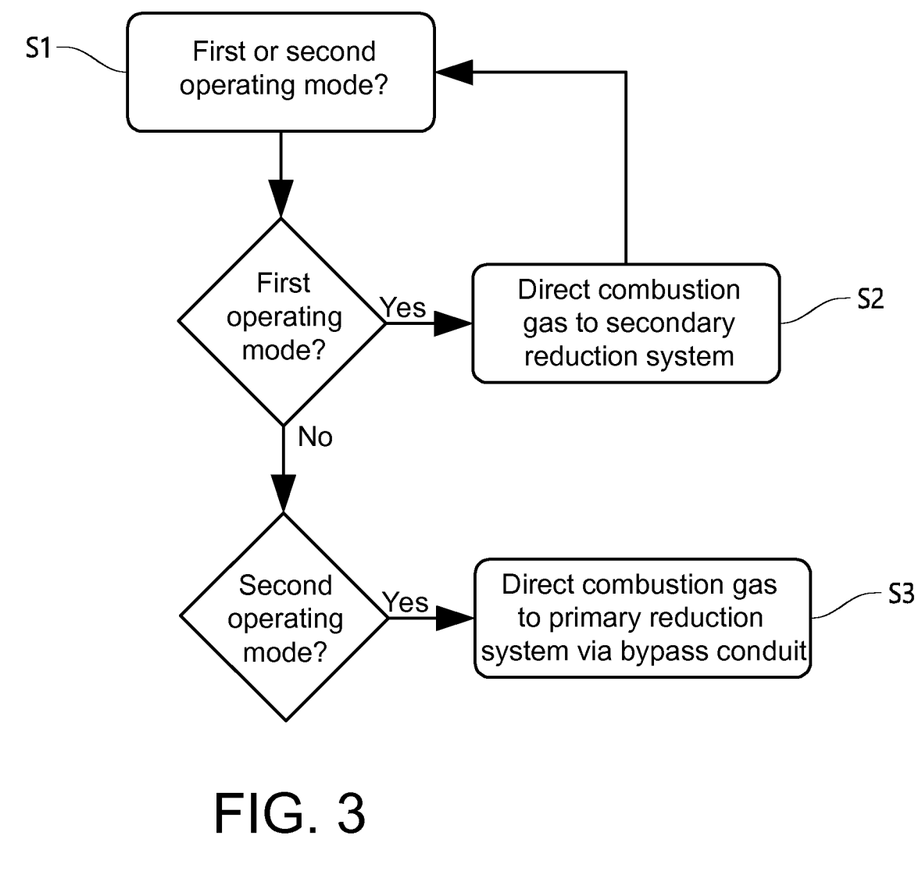
FIG. 3 is a flow chart illustrating an example embodiment of a method for controlling an aftertreatment system.

Reference is now also made to FIG. 3. During operation, the control unit 122 is arranged to determine S1 if the internal combustion engine arrangement 102 is operating in a first operating mode or in a second operating mode. In particular, the control unit 122 may determine that the internal combustion engine arrangement 102 is operating in the first operating mode if the temperature level of the first catalytic reduction arrangement 106 is below a predetermined temperature threshold limit. In such case, the control unit 122 receives a signal indicative of the temperature level of the first catalytic reduction arrangement 106. The control unit may instead, or in addition, determine that the internal combustion engine arrangement 102 is operating in the first operating mode if the temperature level of internal combustion engine arrangement 102 is below a predetermined engine temperature threshold limit. A still further option is to determine that the internal combustion engine arrangement is operating in the first operating mode if the amount of absorbed ammonia in the first catalytic arrangement is below a predetermined threshold limit.

If the control unit 122 determines that the internal combustion engine arrangement 102 is operating in the first operating mode, the control unit 122 controls the first valve arrangement 116 to direct S2 combustion gas from the internal combustion engine 102 to the secondary reduction system 108, i.e. into first conduit 112 and to the second catalytic reduction arrangement 110. Hereby, the control unit 122 also preferably controls the reducing agent injector 120 of the secondary reduction system 108 to inject reductant to the combustion gas before the combustion gas is supplied to the second catalytic reduction arrangement 110. When the gas pressure level in the first conduit exceeds the predetermined gas pressure threshold limit, the check valve 118 will be arranged in the open positon for allowing the combustion gas to be directed to the primary aftertreatment system.

If, on the other hand, the control unit 122 determines that the internal combustion engine arrangement 102 is operating in the second operating mode, the control unit 122 controls the first valve arrangement 116 to direct S3 combustion gas from the internal combustion engine arrangement 102 to the primary aftertreatment system 104 via the bypass conduit. Hereby, the secondary reduction system is bypassed such as to not receive any combustion gas. In contrast to determining if the internal combustion engine arrangement 102 is in the first operating mode, the control unit 122 may determine that the internal combustion engine is operating in the second operating mode if the temperature level of the first catalytic reduction arrangement is equal to, or above the predetermined temperature threshold limit. The control unit may instead, or in addition, determine that the internal combustion engine arrangement 102 is operating in the first operating mode if the temperature level of internal combustion engine arrangement 102 is equal to, or above the predetermined engine temperature threshold limit. The internal combustion engine may also be determined to operate in the second operating mode if the amount of absorbed ammonia in the first catalytic arrangement is equal to, or above the predetermined threshold limit.

It should be noted that during operation in the first operating mode, the internal combustion engine arrangement 102 will eventually be heated up, whereby a transition to the second operating mode will be made. Hence, the control unit continuously determines if the internal combustion engine arrangement 102 is in the first or second operating mode. In such case, when full operation of the first catalytic reduction arrangement is determined, the control unit inhibits further flow of reductant to the first conduit and the first valve arrangement is controlled to direct combustion gas via the bypass conduit.

It should be noted that the control unit may also control the check valve 118 for other purposes. For example the control unit can be arranged to open up for flow both through the bypass conduit 114 and as well as through the secondary reduction system 108 in order to regenerate the secondary reduction system 108 from e.g. soot, reductant deposits and/or Sulphur. The control unit may then engage a heating unit, such as the burner in a heating combustion mode of the engine. In such an event, the control unit may receive control signals from various different sensors of the vehicle.

Figure 4:
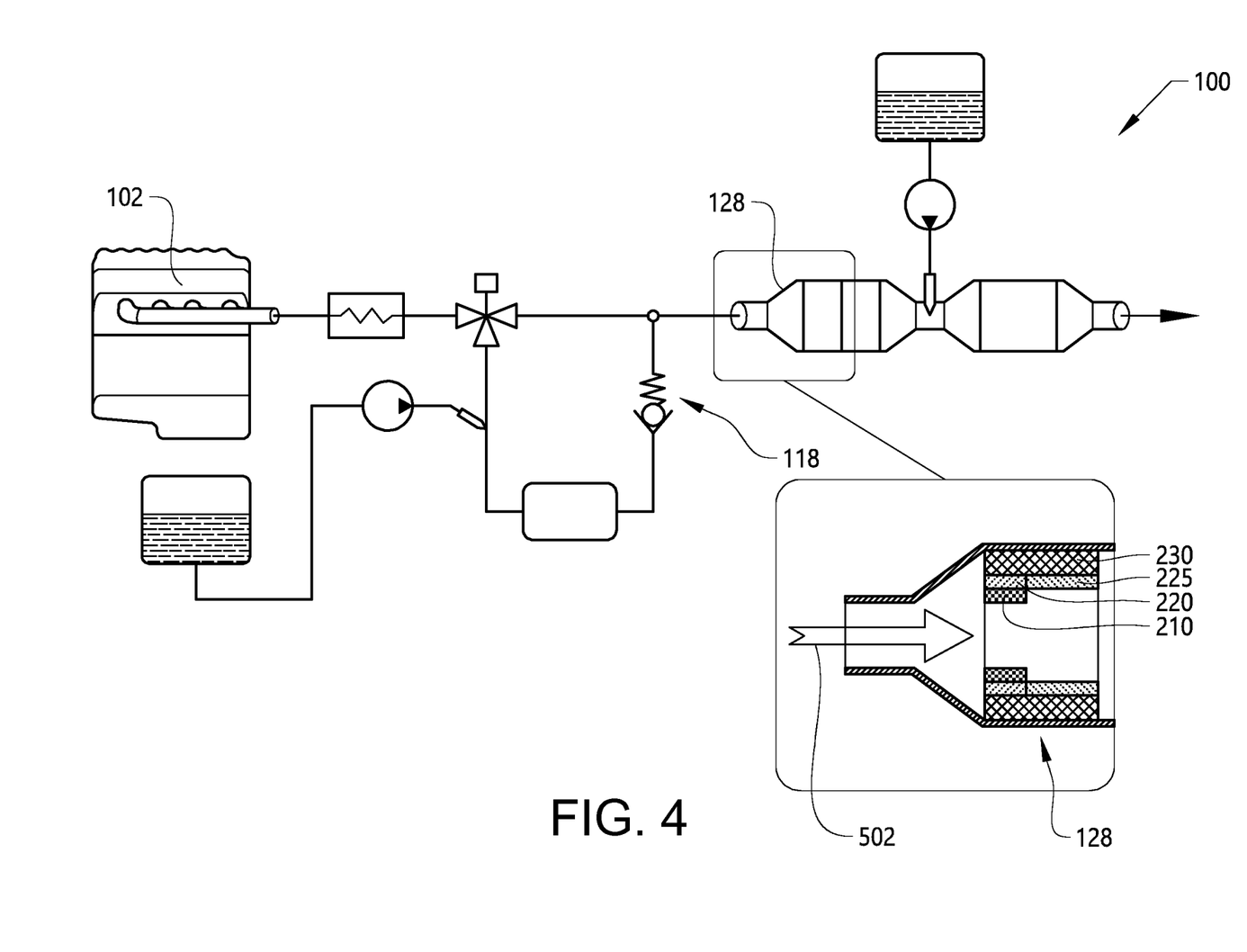
FIG. 4 is a schematic illustration of catalyst layers arranged in the oxidation catalyst according to an example embodiment.

Reference is now made to FIG. 4 which is a schematic illustration of a selective ammonia oxidation catalyst with catalyst layers arranged in the above described oxidation catalyst 128 according to an example embodiment. In particular, FIG. 4 illustrates a cross-section of the catalyst layers in the oxidation catalyst 128. According to the example depicted in FIG. 4, the oxidation catalyst 128 comprises layer of zeolites 210, a layer of metal oxides 220, and a substrate layer 230 comprising e.g. cordierite. The layers 220 and 225 also consist of small amounts of metals. Hereby, particles in the combustion gas 502 can be oxidized by the layer combination. The oxidation catalyst 128 may also comprise an additional layer of metal oxides 225.

By means of the above described catalyst layers, the layer of metal oxides 220 may preferably be arranged to convert Ammonia (NH3) and oxygen (O2) to NO, the layer of zeolite 210 may preferably be arranged to convert the nitrogen oxide (NO), formed in the metal oxide layer, and Ammonia (NH3) to nitrogen (N2).

The plurality of catalyst layers may be arranged differently compared to the illustration in FIG. 4. For example, the substrate layer 230 comprising cordierite may be arranged at least partially between the layer of zeolites 210 and the layer of metal oxides 220.

Figure 5:
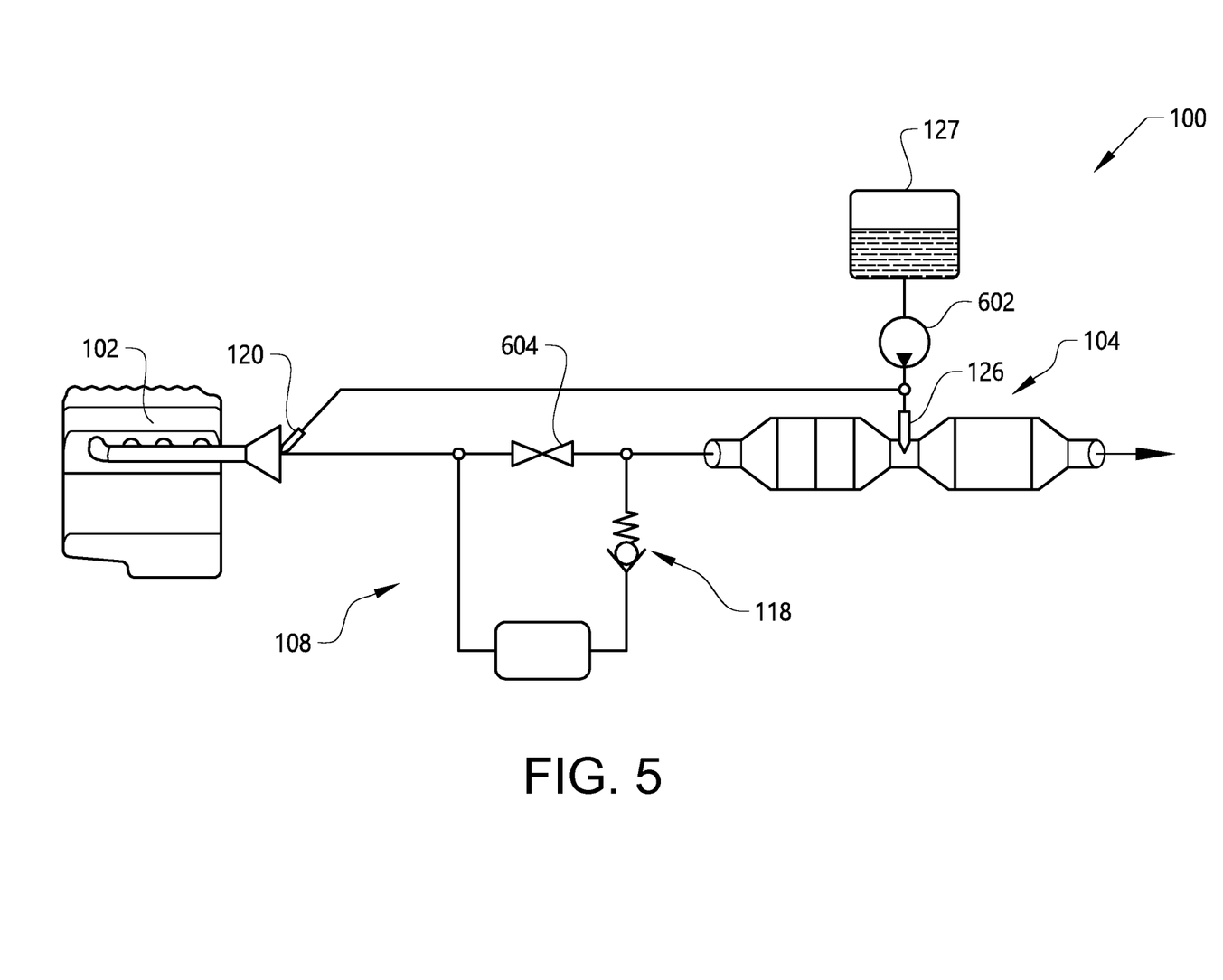
FIG. 5 is a schematic illustration of the aftertreatment system according to another example embodiment.

Reference is finally made to FIG. 5, which is a schematic illustration of the aftertreatment system according to another example embodiment. As can be seen in FIG. 5, the first valve arrangement is arranged in the form of a butterfly valve 604 arranged in the bypass conduit. Furthermore, the reducing agent 120 of the secondary reduction system 108 is positioned in the vicinity of the turbo of the internal combustion engine arrangement 102. The reducing agent 120 of the secondary reduction system 108 and the reducing agent 126 of the primary aftertreatment system 104 are also arranged to share one and the same pump 602, which can thus controllably direct reducing agent to either the reducing agent 120 of the secondary reduction system 108 or the reducing agent 126 of the primary aftertreatment system 104.

It is to be understood that the present disclosure is not limited to the embodiments described above and illustrated in the drawings; rather, the skilled person will recognize that many changes and modifications may be made within the scope of the appended claims.

The invention claimed is:

1. An aftertreatment system connected downstream an internal combustion engine arrangement for receiving combustion gas exhausted from the internal combustion engine arrangement during operation thereof, the aftertreatment system comprising:
a primary aftertreatment system comprising a primary reduction system, the primary reduction system comprising a first catalytic reduction arrangement;
a secondary reduction system comprising a second catalytic reduction arrangement, the secondary reduction system being positioned in a first conduit and arranged in fluid communication between the internal combustion engine arrangement and the primary aftertreatment system;
a bypass conduit connected between the internal combustion engine arrangement and the primary aftertreatment system, wherein the bypass conduit and the first conduit are connected in parallel with each other;
a first valve arrangement connected to the bypass conduit, the first valve arrangement being operable in a first state in which combustion gas exhausted from the internal combustion engine arrangement is directed through the first conduit to the primary aftertreatment system via the secondary reduction system, and second state in which combustion gas exhausted from the internal combustion engine arrangement is directed through the bypass conduit to the primary aftertreatment system bypassing the secondary reduction system; and
a second valve arrangement arranged in the first conduit downstream the second catalytic reduction arrangement in fluid communication between the second catalytic reduction arrangement and the primary aftertreatment system.

2. The aftertreatment system according to claim 1, wherein the first valve arrangement comprises a three-way valve for selectively directing combustion gas to the first conduit and the bypass conduit.

3. The aftertreatment system according to claim 1, wherein the second valve arrangement is operable from a closed position to an open position when a gas pressure level in the first conduit exceeds a predetermined gas pressure threshold limit.

4. The aftertreatment system according to claim 1, wherein the second valve arrangement is one of a pneumatically controlled check valve or an electronically controlled valve connected to a control unit for control of operation thereof.

5. The aftertreatment system according to claim 1, wherein the first and second catalytic reduction arrangements are respective selective catalytic reduction devices arranged to convert nitrogen oxides into diatomic nitrogen.

6. The aftertreatment system according to claim 1, wherein the secondary reduction system comprises a reducing agent injector arranged in the first conduit upstream the second catalytic reduction arrangement for supplying reducing agent to the combustion gas before the combustion gas enters the second catalytic reduction arrangement.

7. The aftertreatment system according to claim 1, further comprising a control unit connected to the first valve arrangement for controlling operation thereof.

8. The aftertreatment system according to claim 7, wherein the control unit is configured to:
receive a signal indicative of a temperature level of the first catalytic reduction arrangement;
compare the temperature level with a predetermined temperature threshold limit;
control the first valve arrangement to direct combustion gas from the internal combustion engine arrangement to the primary aftertreatment system via the first conduit when the temperature level of the first catalytic reduction arrangement is below to the predetermined temperature threshold limit; and
control the first valve arrangement to direct combustion gas from the internal combustion engine arrangement to the primary aftertreatment system via the bypass conduit when the temperature level of the first catalytic reduction arrangement is above or equal to the predetermined temperature threshold limit.

9. The aftertreatment system according to claim 7, wherein the control unit is configured to:
receive a signal indicative of a temperature level of the internal combustion engine arrangement;
compare the temperature level of the internal combustion engine arrangement with a predetermined engine temperature threshold limit;
control the first valve arrangement to direct combustion gas from the internal combustion engine arrangement to the primary aftertreatment system via the first conduit when the temperature level of the internal combustion engine arrangement is below the predetermined engine temperature threshold limit; and
control the first valve arrangement to direct combustion gas from the internal combustion engine arrangement to the primary aftertreatment system via the bypass conduit when the temperature level of the internal combustion engine arrangement is above or equal to the predetermined engine temperature threshold limit.

10. The aftertreatment system according to claim 1, further comprising a burner arrangement positioned in fluid communication between the internal combustion engine arrangement and the first valve arrangement.

11. The aftertreatment system according to claim 1, wherein the primary aftertreatment system further comprises a primary reducing agent injector arranged upstream the first catalytic reduction arrangement for supplying reducing agent to the combustion gas before the combustion gas enters to the first catalytic reduction arrangement.

12. The aftertreatment system according to claim 1, wherein the primary aftertreatment system further comprises an oxidation catalyst and a particulate filter upstream the first catalytic reduction arrangement.

13. The aftertreatment system according to claim 12, wherein the oxidation catalyst comprises a plurality of catalyst layers for oxidizing components in the combustion gas.

14. The aftertreatment system according to claim 13, wherein the plurality of catalyst layers comprises a material composition of metal oxides and/or zeolites.

15. The aftertreatment system according to claim 13, wherein the oxidation catalyst further comprises a substrate layer comprising cordierite.

16. A method for controlling an aftertreatment system connected downstream an internal combustion engine arrangement, the aftertreatment system comprises a primary aftertreatment system comprising a primary reduction system, the primary reduction system comprising a first catalytic reduction arrangement; a secondary reduction system comprising a second catalytic reduction arrangement, the secondary reduction system being arranged in fluid communication between the internal combustion engine arrangement and the primary aftertreatment system via a first conduit; and a bypass conduit connected between the internal combustion engine arrangement and the primary aftertreatment system, wherein the bypass conduit and the first conduit are connected in parallel with each other, the method comprising the steps of:

determining when the internal combustion engine arrangement is operating in a first operating mode or in a second operating mode;

directing combustion gas from the internal combustion engine arrangement to the primary aftertreatment system via the secondary reduction system when the internal combustion engine arrangement is operating in the first operating mode;

directing combustion gas from the internal combustion engine arrangement to the primary aftertreatment system via the bypass conduit for bypassing the secondary reduction system when the internal combustion engine arrangement is operating in the second operating mode.

17. The method according to claim 16, wherein the internal combustion engine arrangement is operating in the first operating mode when the temperature level of the first catalytic reduction arrangement is below a predetermined temperature threshold limit.

18. The method according to claim 16, further comprising the steps of:

determining an amount of ammonia absorbed in the first catalytic reduction arrangement; and determining that the internal combustion engine arrangement is operating in the first operating mode when the amount of absorbed ammonia is below a predetermined threshold limit.

19. The method according to claim 16, wherein the internal combustion engine arrangement is operating in the first operating mode when the temperature level of the internal combustion engine arrangement is below a predetermined engine temperature threshold limit.

20. A vehicle comprising an internal combustion engine arrangement and an aftertreatment system according to claim 1.

* * * * *